US012345374B2

(12) United States Patent
Seong et al.

(10) Patent No.: US 12,345,374 B2
(45) Date of Patent: Jul. 1, 2025

(54) WALL MOUNT FOR DISPLAY APPARATUS AND INSTALLATION METHOD THEREOF

(71) Applicant: SAMSUNG ELECTRONICS CO., LTD., Suwon-si (KR)

(72) Inventors: Bokyung Seong, Suwon-si (KR); Bumho Chun, Suwon-si (KR); Gyoosang Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/099,359

(22) Filed: Jan. 20, 2023

(65) Prior Publication Data

US 2023/0160523 A1 May 25, 2023

Related U.S. Application Data

(63) Continuation of application No. PCT/KR2021/010305, filed on Aug. 4, 2021.

(30) Foreign Application Priority Data

Sep. 28, 2020 (KR) .................. 10-2020-0125925

(51) Int. Cl.
*F16M 13/02* (2006.01)
*F16M 11/04* (2006.01)
*F16M 11/10* (2006.01)

(52) U.S. Cl.
CPC .......... *F16M 13/02* (2013.01); *F16M 11/046* (2013.01); *F16M 11/10* (2013.01)

(58) Field of Classification Search
CPC .. A47G 1/20; A47G 1/14; A47G 1/142; F16B 5/06; F16B 43/00; F16B 5/008;
(Continued)

(56) References Cited

U.S. PATENT DOCUMENTS 3,074,680 A * 1/1963 Stewart ................ A47G 1/1613
248/224.7
3,865,342 A * 2/1975 Kanzelberger ....... A47G 1/1626
40/757
(Continued)

FOREIGN PATENT DOCUMENTS

JP 10-240155 A 9/1998
JP 11-37388 A 2/1999
(Continued)

OTHER PUBLICATIONS

International Search Report issued in International Application No. PCT/KR2021/010305 dated Nov. 12, 2021.
(Continued)

*Primary Examiner* — Alfred J Wujciak
(74) *Attorney, Agent, or Firm* — STAAS & HALSEY LLP

(57) ABSTRACT

A wall mount for a display apparatus comprises: a mount holder including a first fixing portion coupleable to a wall surface and a second fixing portion coupleable to the first fixing part; and a body including a coupling bracket coupleable to the display apparatus and a mounting hole insertable into and coupleable to a gap between the first fixing portion and the second fixing portion of the mount holder while the second fixing portion is coupled to the first fixing portion, where the second fixing portion is rotatable in a first direction and a second direction opposite the first direction so that a width of the gap is adjusted according to the second fixing portion being rotated in the first direction and the second direction.

10 Claims, 10 Drawing Sheets

(58) Field of Classification Search
CPC .... F16B 5/0216; F16B 5/0225; F16B 5/0283; F16B 5/0628; F16M 13/02; F16M 11/046; F16M 11/10
USPC .... 248/475.1, 476, 477, 482, 917, 918, 127, 248/146, 154, 489, 466, 469, 470
See application file for complete search history.

(56) References Cited

U.S. PATENT DOCUMENTS

| | | | | |
|---|---|---|---|---|
| 6,089,387 | A * | 7/2000 | Varfolomeeva | A47F 5/0031 211/90.03 |
| 7,580,248 | B2 * | 8/2009 | Ogawa | H04N 5/64 248/921 |
| 7,954,782 | B2 * | 6/2011 | Harralson | A47G 1/205 248/354.1 |
| 8,695,936 | B2 | 4/2014 | Park et al. | |
| 9,282,833 | B2 | 3/2016 | Park et al. | |
| 10,253,921 | B2 | 4/2019 | Yoon et al. | |
| 10,433,443 | B2 | 10/2019 | Kang | |
| 11,068,022 | B2 | 7/2021 | So et al. | |
| 2007/0138356 | A1 * | 6/2007 | Johansson | F16M 11/046 248/125.1 |
| 2007/0210234 | A1 * | 9/2007 | Lin | A47G 1/162 248/475.1 |
| 2008/0035811 | A1 | 2/2008 | Kim et al. | |
| 2008/0078916 | A1 * | 4/2008 | Nevers | A47G 1/1606 248/475.1 |
| 2009/0165319 | A1 * | 7/2009 | Gallien | A47G 1/205 33/666 |
| 2010/0133409 | A1 | 6/2010 | Park et al. | |
| 2011/0297806 | A1 | 12/2011 | Park et al. | |
| 2011/0297807 | A1 | 12/2011 | Park et al. | |
| 2012/0126076 | A1 | 5/2012 | Park et al. | |
| 2013/0168519 | A1 | 7/2013 | In et al. | |
| 2014/0166834 | A1 | 6/2014 | Kuroyanagi et al. | |
| 2015/0330435 | A1 * | 11/2015 | Schwarzbich | F16B 5/0283 411/16 |
| 2018/0270972 | A1 | 9/2018 | Kang | |
| 2023/0057170 | A1 * | 2/2023 | Lam | F16M 13/02 |

FOREIGN PATENT DOCUMENTS

| | | |
|---|---|---|
| KR | 10-0763283 B1 | 10/2007 |
| KR | 10-2008-0015296 A | 2/2008 |
| KR | 10-2010-0061776 A | 6/2010 |
| KR | 10-0962008 B1 | 6/2010 |
| KR | 10-2011-0012922 A | 2/2011 |
| KR | 10-2013-0078565 A | 7/2013 |
| KR | 10-2017-0020386 A | 2/2017 |
| KR | 20-2017-0002879 U | 8/2017 |
| KR | 10-1821789 B1 | 1/2018 |
| KR | 10-2018-0036170 | 4/2018 |
| KR | 10-2018-0074543 | 7/2018 |
| KR | 10-2018-0106450 A | 10/2018 |

OTHER PUBLICATIONS

Written Opinion issued in International Application No. PCT/KR2021/01/03/05 dated Nov. 12, 2021.
Korean Office Action dated May 23, 2025 for Korean Application No. 10-2020-0125925.

* cited by examiner

WALL MOUNT FOR DISPLAY APPARATUS AND INSTALLATION METHOD THEREOF

CROSS-REFERENCE TO RELATED APPLICATION(S)

This application is a continuation application, under 35 U.S.C. § 111(a), of international application No. PCT/KR2021/010305, filed on Aug. 4, 2021, which claims priority under 35 U. S. C. § 119 to Korean Patent Application No. 10-2020-0125925, filed on Sep. 28, 2020, the disclosures of which are incorporated herein by reference in their entirety.

BACKGROUND

Field

The disclosure relates to a wall mount for a display apparatus and an installation method thereof, and more particularly, to a wall mount for a display apparatus including a mount holder capable of adjusting the width of a gap, and an installation method thereof.

DESCRIPTION OF RELATED ART

Display apparatuses are output devices that visually express data by an operation of pixel or sub-pixel units, and with the development of technologies, research has been conducted to increase a size of display screens and reduce a thickness and weight of displays.

A wall mount for a display apparatus is a device allowing a display apparatus to be installed on a wall to minimize restrictions on an installation location and reduce the space occupied by the display apparatus.

In a wall mount for a display apparatus of a related art, a plurality of screw holes for inserting a plurality of screws had to be drilled in the wall in order to support and fix the display apparatus.

Drilling a screw hole on the wall left holes or marks on the wall even after dismantling a wall mount for the display apparatus, making it difficult to restore the wall to its original state. In addition, in order to support the display apparatus, a diameter of the screw hole and a depth may increase, and there were many restrictions in drilling a plurality of screw holes depending on the user's living environment and the type and material of the wall.

SUMMARY

According to an embodiment of the disclosure, a wall mount for a display apparatus includes: a mount holder including a first fixing portion coupleable to a wall surface and a second fixing portion coupleable to the first fixing portion; and a body including a coupling bracket coupleable to the display apparatus and a mounting hole insertable into a gap between the first fixing portion and the second fixing portion of the mount holder while the second fixing portion is coupled to the first fixing portion, wherein the second fixing portion is rotatable in a first direction and a second direction opposite to the first direction so that a width of the gap is adjusted according to the second fixing portion being rotated in the first direction and the second direction.

A lower end portion of the mounting hole has a diameter larger than an outer diameter of the mount holder and an upper end portion of the mounting hole has a diameter smaller than the diameter of the lower end portion of the mounting hole.

The body may include a clasp formed at an upper end of the mounting hole, and the clasp is configured to be rotatable along a vertical direction of the display apparatus so that the clasp may rotate from a higher position to a lower position along the vertical direction while the mount holder is coupled to the body to prevent separation of the mount holder.

The body may include a plurality of bracket coupling portions to which the coupling bracket is coupleable, and the coupling bracket may be selectively coupleable to a bracket coupling portion among the plurality of bracket coupling portions.

The coupling bracket may include a fixed bracket fixed to the bracket coupling portion and a rotating bracket configured to fix the display apparatus and be tiltably hinged to the fixed bracket.

The wall mount may include a stand coupleable to a lower end of the body to support the body, wherein the stand may include a body coupling portion coupleable to the body and a bottom surface configured to support the body coupling portion.

The body may include a plurality of body holes spaced apart along a vertical direction, and the body coupling portion may include a stand hole fixed to any hole among the plurality of body holes using a coupling screw, and the first fixing portion is coupleable to the wall surface by a fixing screw.

The body may include a cable accommodating portion a front which is open; a cable holder positionable in the cable accommodating portion; and a body cover configured to cover the front of the body.

According to another embodiment of the disclosure, an installation method of a wall mount for a display apparatus includes: fixing a first fixing portion to a wall surface and coupling a second fixing portion to the first fixing portion, the first fixing portion and the second fixing portion being formed to have a gap therebetween while the second fixing portion is coupled to the first fixing portion to allow a mount holder to be installed; inserting a mounting hole of a body into the gap between the first fixing portion and the second fixing portion of the mount holder to couple the body to the mount holder; and rotating the second fixing portion in a first direction and a second direction opposite to the first direction so that a width of the gap is adjusted according to the second fixing portion being rotated in the first direction and the second direction.

A lower end portion of the mounting hole may have a diameter larger than an outer diameter of the mount holder and the coupling of the body to the mount holder includes: allowing the mount holder to pass through the lower end portion of the mounting hole; and moving the body in from the lower end portion of the mounting hole to position the mount holder at an upper end portion of the mounting hole having a diameter smaller than the lower end portion of the mounting hole.

The coupling of the body to the mount holder may further include rotating a clasp at an upper end of the mounting hole toward a lower end of the mounting hole to prevent separation of the mount holder.

The method may further include: coupling a coupling bracket, to which the display apparatus is coupleable, a bracket coupling portion among a plurality of bracket coupling portions of the body in a position corresponding to a structure of the display apparatus and adjusting a position of the coupling bracket.

The coupling bracket may include a fixed bracket fixed to the bracket coupling portion and a rotating bracket configured to fix the display apparatus and to be tiltably hinged to the fixed bracket.

The method may further include coupling the display apparatus to the coupling bracket.

The coupling of the body to the mount holder may include fixing any hole among a plurality of body holes spaced apart from each other in a vertical direction of the body to a stand hole of a stand coupleable to a lower end of the body to support the body using a coupling screw and adjusting a height of the body and the stand.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
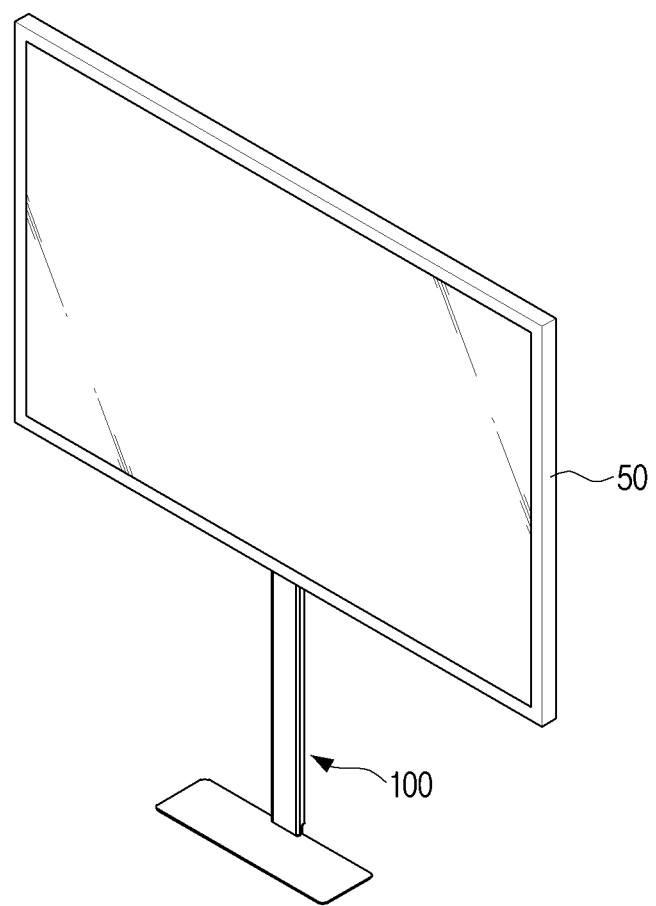
FIG. 1 is a perspective view of a wall mount for a display apparatus according to an embodiment of the disclosure.

Hereinafter, embodiments of the disclosure will be described with reference to the accompanying drawings. Meanwhile, the disclosure is not limited to the embodiments described herein, but may be implemented in various forms, and various modifications may be made to the embodiments of the disclosure. The descriptions of the embodiments of the disclosure are provided for comprehensiveness, and to provide persons having ordinary knowledge in the technical field to which the disclosure belongs with comprehensive understanding of the range of the disclosure. Meanwhile, in the accompanying drawings, components may include enlarged sizes than as compared to their actual sizes for convenience of description, and the proportion of each component may be exaggerated or reduced.

The terms used in the specification and claims of the disclosure are selected as general terms in consideration of functions in various exemplary embodiments of the disclosure. However, these terms may depend on intentions of those skilled in the art or legal or technical interpretations, emergences of new technologies, and the like. Some of the terms are arbitrarily selected by the applicant. These terms may be construed as meanings defined in the present specification, and unless the terms are defined in detail, the terms may be construed based on general contents of the present specification and common technical knowledge of the art to which exemplary embodiments belong.

In the description of the disclosure, the order of each step should be understood to be non-limiting, unless the preceding step must be performed logically and temporally before the following step. In other words, except for the exceptional case above, even if the process described in the following step is performed before the process described in the preceding stage, the nature of the invention is not affected and the scope of the right should be defined regardless of the order of the steps.

In the disclosure, an expression such as "having," "may have," "comprising," or "may comprise" indicates existence of a corresponding characteristic (e.g., a numerical value, a function, an operation, or an element like a part) and does not exclude existence of additional characteristic.

Further, terms such as "first," "second," and the like, may be used to describe various elements, but the elements are not intended to be limited by the terms. Such terms may be used to distinguish one element from another element. For example, a "first" element may be referred to as a "second" element, and a "second" element may be referred to as a "first" element in a similar manner, without departing from the scope of the disclosure.

In this specification, the terms "front surface," "rear surface," "upper surface," "lower surface," "side surface," "left side," "right side," "upper portion," "lower portion," and "region used in the following description are defined with reference to the drawings, and the shape and position of each component are not limited by these terms.

Further, because elements necessary in describing each embodiment are described herein, the embodiments are not necessarily limited thereto. Accordingly, some elements may be modified or omitted, and other elements may be included. In addition, the elements may be disposed broken up in apparatuses independent from one another.

Furthermore, although the accompanied drawings and embodiments have been described in detail with reference to the descriptions disclosed in the accompanied drawings, it is to be understood that the disclosure is not limited by the embodiments.

The disclosure provides a wall mount for a display apparatus capable of supporting a display apparatus with only one mount holder and fixing the display apparatus in close contact with a wall surface and an installation method thereof.

Hereinafter, the disclosure will be described in more detail with reference to FIGS. 1 to 8.

FIG. 1 is a perspective view of a wall mount 100 for a display apparatus according to an embodiment of the disclosure.

Referring to FIG. 1, the wall mount 100 for a display apparatus may be coupled to a display apparatus 50.

The display apparatus 50, which is an output device that visually expresses data by an operation of pixel or sub-pixel units, may include display apparatuses ranging from, for example, the display apparatus 50 using a liquid crystal display panel to the display apparatus 50 including various types of panels such as an organic light emitting diode panel, a plasma display panel, a light emitting diode panel, a micro LED panel, and the like.

The display apparatus 50 may be implemented as a home TV, but is not limited thereto in actual application and may be applied to an apparatus having a display function, such as a video wall, a large format display (LFD), a digital signage, a digital information display (DID), a projector display, and the like.

The wall mount 100 for a display apparatus, as a support device for supporting the display apparatus 50 and fixing the display apparatus 50 to a wall surface 10, may increase space utilization of the display apparatus.

For the wall mount 100 for a display apparatus, drilling a screw hole through which at least one screw is inserted may be essential on the wall surface 10 in order to fix the display apparatus 50.

In another embodiment that requires a plurality of screw holes, expertise is required in drilling a plurality of screw holes in order to level the display apparatus 50 during an installation process, and in addition, in order for the screws to support a weight of the display apparatus 50, a diameter of the screw holes and a depth thereof may increase.

However, in the wall mount 100 for a display apparatus according to an embodiment of the disclosure, a bottom surface 145 may have a structure for supporting the weight of the display apparatus 50, thereby minimizing drilling of the screw hole.

However, in general, a support device having the bottom surface 145 may become bulky and heavy in order to stably support and balance the display apparatus 50, but the wall mount 100 for a display apparatus of the disclosure may be minimized in size and weight through a structure to be described below to support the display apparatus 50 and bring the display apparatus into close contact with the wall surface 10.

Figure 2:
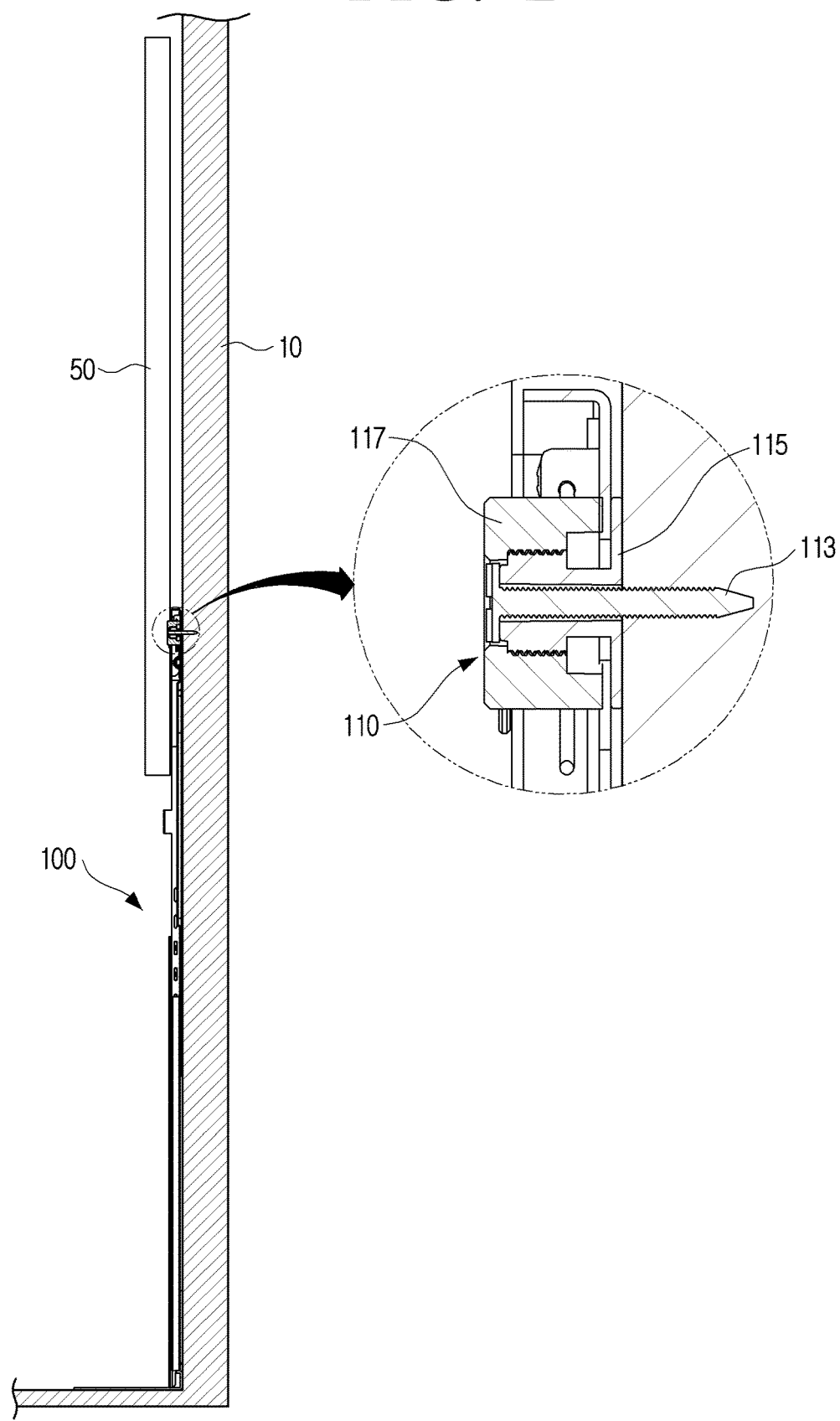
FIG. 2 is a side view of a wall mount for a display apparatus according to an embodiment of the disclosure.

FIG. 2 is a side view of a wall mount 100 for a display apparatus according to an embodiment of the disclosure.

Referring to FIG. 2, the wall mount 100 for a display apparatus may include a mount holder 110.

The mount holder 110 may fix the wall mount 100 for a display apparatus to the wall surface 10. The mount holder 110 may include a first fixing portion 115 and a second fixing portion 117, and may be fixed by a fixing screw 113. The mount holder 110 may prevent the display apparatus 50 and the wall mount 100 for a display apparatus from falling forward, and may balance in a horizontal direction. A detailed structure of the mount holder 110 will be described later with reference to FIG. 4.

In the process of installing the wall mount 100 for a display apparatus, a screw hole into which the fixing screw 113 passing through the mount holder 110 is inserted may be drilled in the wall surface 10. The mount holder 110 may serve to fix the wall mount 100 for a display apparatus so that the wall mount 100 for a display apparatus may not fall over to the front or side.

According to another embodiment of the disclosure, although not shown in the drawings, the display apparatus 50 may be fixed and supported to be suspended on the wall surface 10 with one screw of the mount holder 110. For example, it may be a case in which the display apparatus 50 is reduced in weight according to technological development or only a display panel that is an output unit of the display apparatus 50 is supported. In this case, the wall mount 100 for a display apparatus may not be supported on the bottom surface 145, and the mount holder 110 may fix the wall mount 100 for a display apparatus to support the display apparatus 50.

In addition, in the wall mount 100 for a display apparatus of the disclosure, the mount holder 110 may be coupled to the wall surface 10 to maintain a balance, and the wall mount 100 for a display apparatus is supported on the bottom surface 145 as will be described later, so that the wall mount 100 for a display apparatus may be implemented in a slim form as shown in FIG. 2. Therefore, the display apparatus 50 may be installed to be in close contact with the wall surface 10 more closely, and the aesthetic effect may be increased by reducing visibility of the wall mount 100 for a display apparatus.

In addition, because a horizontal balance of the display apparatus 50 may be maintained with one mount holder 110, the wall mount 100 for a display apparatus of the disclosure may be easily installed without having to horizontally drill a plurality of screw holes of the display apparatus 50 in a horizontally balanced manner. Therefore, convenience in installation, post-management, and dismantling may be increased.

Figure 3:
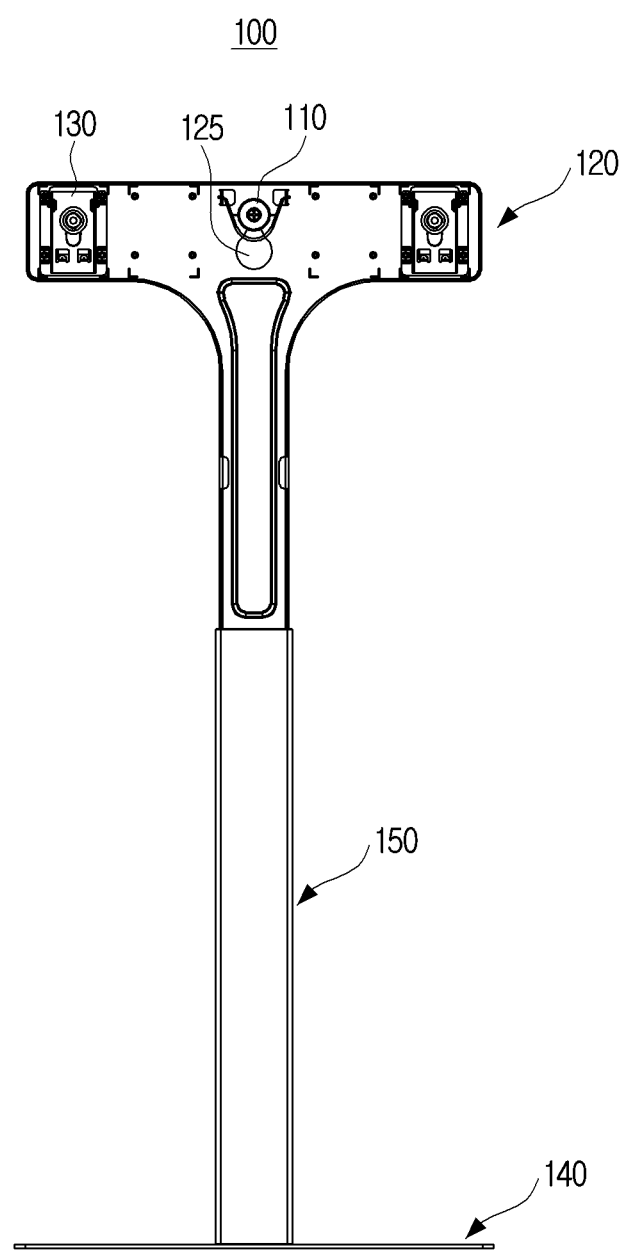
FIG. 3 is a front view of a wall mount for a display apparatus according to an embodiment of the disclosure.

FIG. 3 is a front view of the wall mount 100 for a display apparatus according to an embodiment of the disclosure.

Referring to FIG. 3, the wall mount 100 for a display apparatus may include a body 120, a stand 140, and a body cover 150.

The body 120 is a housing structure forming the exterior of the wall mount 100 for a display apparatus, and may be formed of a rigid body. The body 120 may include a mounting hole 125 that is inserted and coupled to a gap of the mount holder 110, and the body 120 may be fixed to the wall surface 10 as the mounting hole 125 is fixed.

The body 120 may have a structure extending in a vertical direction from the bottom surface 145, and a mounting hole 125 may be formed on a horizontal center line. An upper portion of the body 120 may have a T shape spread out to both sides in the horizontal direction as shown in FIG. 2. A coupling bracket 130 may be coupled to the spread structure of the body 120 to stably support the left and right sides of the display apparatus 50.

Although not shown in the drawings, the coupling bracket 130 of the wall mount 100 for a display apparatus may be coupled to a coupling portion formed on a lower surface of the display according to the structure of the display apparatus 50. In this case, the body 120 may have an 'I' shape or an inverted 'T' shape.

The stand 140 may be coupled to a lower end of the body 120 to support the body 120. Alternatively, the stand 140 may be formed of one continuous body with the body 120.

The stand 140 may include a body coupling portion 143 coupled to the body 120 and the bottom surface 145 supporting the body coupling portion 143. A structure of the body coupling portion 143 will be described later with reference to FIGS. 7A to 7B.

The bottom surface 145 balances the left and right sides of the body 120, and is a structure for supporting a load received from the body 120, and may have a flat surface shape extending parallel to the bottom surface 145 and may have a circular or semi-circular structure or a polygonal structure such as a quadrangle.

Because the bottom surface 145 supports the load of the display apparatus 50, the bottom surface 145 may include an additional support member (not shown) such as an elastic support leg on a lower surface thereof to stably support the display apparatus 50. The additional support member (not shown) may have a structure having a height, and in addition to adjustment of the height through the body coupling portion 143 to be described later, a height of the body 120 may be adjusted.

The body cover 150 has a structure covering a front surface of the body 120, and when a cable 55 of the display apparatus 50 is installed in a cable accommodating portion 123 of the body 120, the body cover 150 may protect the cable 55 from the outside. The body cover 150 may correspond to a shape of the body 120, and although there is no limitation in a specific corresponding portion, the body cover 150 may partially cover a portion of the body 120 exposed to the outside when the display apparatus 50 is coupled.

The body cover 150 may be manufactured in various colors. The body cover 150 may be selected to have the same or similar color as the wall surface 10 of a place to install in, so that the wall mount 100 for a display apparatus may lower visibility of the wall mount 100 for a display apparatus not to interfere with the user's viewing of the display apparatus 50. Alternatively, the shape and color of the body cover 150 may exert an aesthetic effect through brand partnership or individual design.

Figure 4:
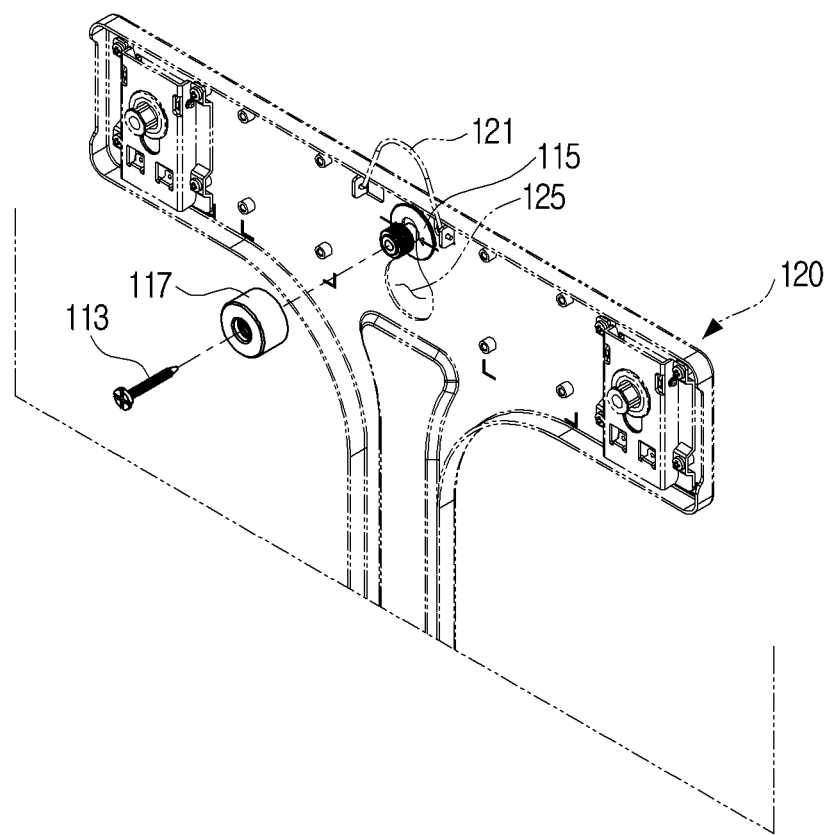
FIG. 4 is an exploded perspective view of a mount holder according to an embodiment of the disclosure.

FIG. 4 is an exploded perspective view of the mount holder 110 according to an embodiment of the disclosure.

Referring to FIG. 4, the mount holder 110 may include a first fixing portion 115 and a second fixing portion 117.

The first fixing portion 115 may be attached to the wall surface 10 and fixed to the wall surface 10 by a fixing screw 113. A central portion of the first fixing portion 115 may have an open structure in which a through hole through which the fixing screw 113 may pass is formed, and a diameter and shape of the through hole may correspond to a diameter and shape of the fixing screw 113.

The second fixing portion 117 may be coupled to the first fixing portion 115 by forming a gap. In detail, the first fixing portion 115 and the second fixing portion 117 may be fixed such that at least portions thereof facing each other do not contact each other, and an empty space between the facing surfaces may be a gap.

The fixing screw 113 may be coupled and fixed only to the first fixing portion 115, or the second fixing portion 117 may also be coupled to and fixed as shown in FIG. 2.

The second fixing portion 117 may be rotatable in one direction and the other direction opposite to the one direction, and a width of the gap may be adjusted according to a rotation direction. In order to realize this, the first fixing portion 115 may have a structure of a bolt extending in a front direction, while a rear surface thereof supports the wall surface 10, and the second fixing portion 117 may have a structure of a nut corresponding to the bolt structure of the first fixing portion 115. According to a rotation direction of the second fixing portion 117, the bolt and the nut may be tightened to be closer to each other or may be loosened to become away from each other, through which the gap may be adjusted.

The gap may be inserted into and coupled to the mounting hole 125 of the body 120. According to an embodiment of the disclosure, the mounting hole 125 of the body 120 may be smaller than an outer diameter of the mount holder 110. In this case, after the first fixing portion 115 is disposed to pass through the mounting hole 125, the second fixing portion 117 may be coupled and the gap may be adjusted to correspond to a thickness of the mounting hole 125. Accordingly, the front surface of the first fixing portion 115 may be fixed to the rear surface of the body 120 and the rear surface of the second fixing portion 117 may be fixed in close contact with the front surface of the body 120.

According to another embodiment of the disclosure, the mounting hole 125 may include a lower end portion having a diameter larger than that of an outer diameter of the mount holder 110 and an upper end portion having a diameter smaller than the lower end portion. In this case, in a state in which the second fixing portion 117 is coupled to the first fixing portion 115, the gap is widened and then a mount hole is passed through the lower end portion of the mounting hole 125, and the body 120 may be moved to a lower end, so that the mount holder 110 may be positioned at the upper end portion of the mounting hole 125. Also, a width of the gap may be reduced by rotating the second fixing portion 117, and the front surface of the first fixing portion 115 may be fixed in close contact with the rear surface of the body 120, and the rear surface of the second fixing portion 117 may be fixed in close contact with the front surface of the body 120.

Due to the function of adjusting the width of the gap of the mount holder 110, the mount holder 110 may be easily coupled to the body 120 when the wall mount 100 for a display apparatus is installed, thereby increasing convenience and intuitiveness.

In addition, a gap occurring in a use stage may be prevented and the body 120 may be prevented from leaning forward. Even after the display apparatus 50 is installed, the user may easily and conveniently separate the body 120 by adjusting the gap, and because the body 120 may be coupled and fixed intuitively, the wall mount 100 for a display apparatus may be convenient for maintenance and repair.

A clasp 121 may be formed at an upper end of the mounting hole 125 and may be rotatable in a vertical direction. When the mount holder 110 is not coupled to the body 120, the clasp 121 may be positioned in an upper end direction or may be moved in the upper end direction for installation. When the mount holder 110 is coupled to the body 120, the clasp 121 may rotate in a lower end direction to prevent the mount holder 110 from being separated in the lower end direction.

Because the diameter of the lower end portion of the mounting hole 125 is larger than the outer diameter of the mount holder 110, when an impact is applied to the body 120 or the gap in the mount holder 110 changes, coupling of the mount holder 110 and the body 120 may be loosened, and the mount holder 110 may be separated from the body 120.

Due to this, the display apparatus 50 may be damaged and there is a risk of a safety accident, so the clasp 121 is proposed to move in the lower end direction of the mount holder 110 so that the mount holder 110 is not separated, thereby increasing safety of the wall mount 100 for a display apparatus.

Figure 5:
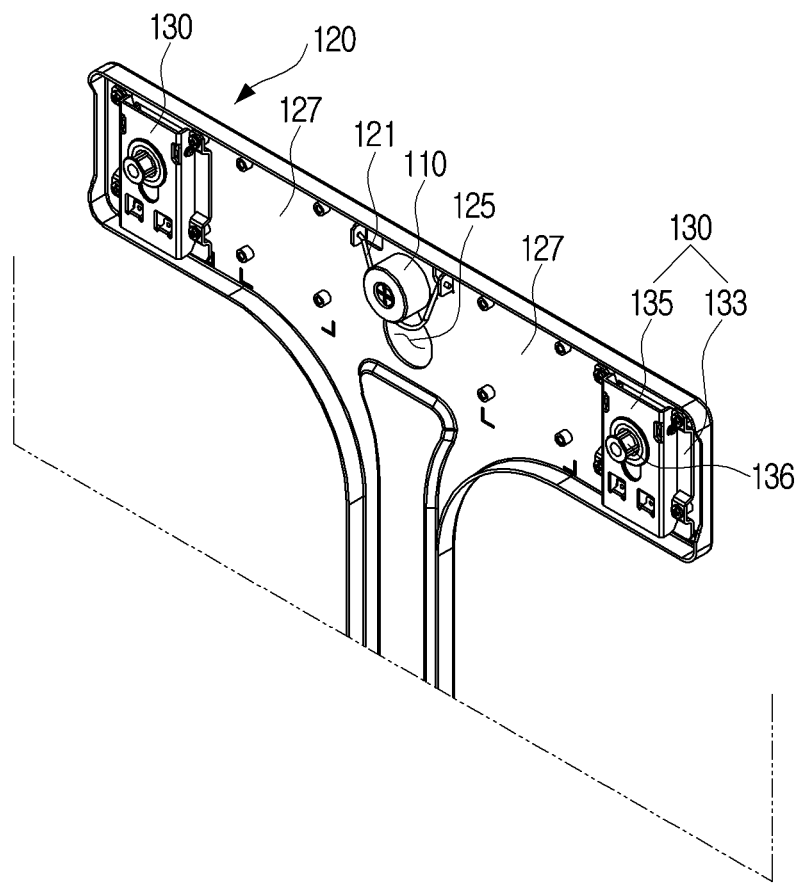
FIG. 5 is a perspective view illustrating a portion of a wall mount for a display apparatus according to an embodiment of the disclosure.

FIG. 5 is a perspective view illustrating a portion of the wall mount 100 for a display apparatus according to an embodiment of the disclosure.

Referring to FIG. 5, the wall mount 100 for a display apparatus may include a coupling bracket 130 and a bracket coupling portion 127.

The coupling bracket 130 is a fixing member that may be coupled to the display apparatus 50, and a shape and structure thereof may vary depending on the display apparatus 50.

When the display apparatus 50 conforms to a basic standard of the coupling bracket 130 and has an accommodating portion that may be directly coupled to the coupling bracket 130, the coupling bracket 130 may include only a fastening portion 136 for supporting the display apparatus 50.

However, if the display apparatus 50 does not conform to the basic standard of the coupling bracket 130, the coupling bracket 130 may include an additional structure to correspond to the display apparatus 50.

In detail, a VESA hole is located on the rear surface of the display apparatus 50 as an accommodating portion of the display apparatus 50, and horizontal and vertical intervals of the VESA hole may vary depending on the display apparatus 50. Therefore, the arrangement and structure of the coupling bracket 130 of the disclosure may vary depending on the arrangement of the VESA hole of the display apparatus 50.

In order to fix the various display apparatuses 50, the coupling bracket 130 may include a fixed bracket 133 fixed to the bracket coupling portion 127 of the body 120 and a rotating bracket 135 hinged to the bracket hinge 137 to be tiltable to the fixed bracket 133 fixed to the display apparatus 50. Also, the coupling bracket 130 may further include the fastening portion 136 corresponding to a shape of the accommodating portion of the display apparatus 50 attached to the rotating bracket 135, and the body 120 may include a plurality of bracket coupling portions 127 to which the coupling bracket 130 is coupled.

Accordingly, the fixed bracket 133 may be selectively coupled to any one of the plurality of bracket coupling portions 127 to correspond to the interval of the accommodating portion of the display apparatus 50.

For example, the plurality of bracket coupling portions 127 may be spaced apart from each other to correspond to the structure of the VESA hole of the general display apparatus 50. For example, a total of four bracket coupling portions 127 may be spaced apart from each other at intervals of 100 mm, and when horizontal and vertical intervals of the VESA hole of the display apparatus 50 are 200*200 mm, the coupling bracket 130 may be connected to the two bracket coupling portions 127 located at the center, and when the horizontal and vertical intervals of the VESA hole of the display apparatus 50 are 400*400 mm, the coupling bracket 130 may be connected to two bracket coupling portions 127 located outside.

Therefore, by including the plurality of bracket coupling portions 127, the wall mount 100 for a display apparatus of the disclosure may fix the display apparatus 50 having various structures.

Figure 6:
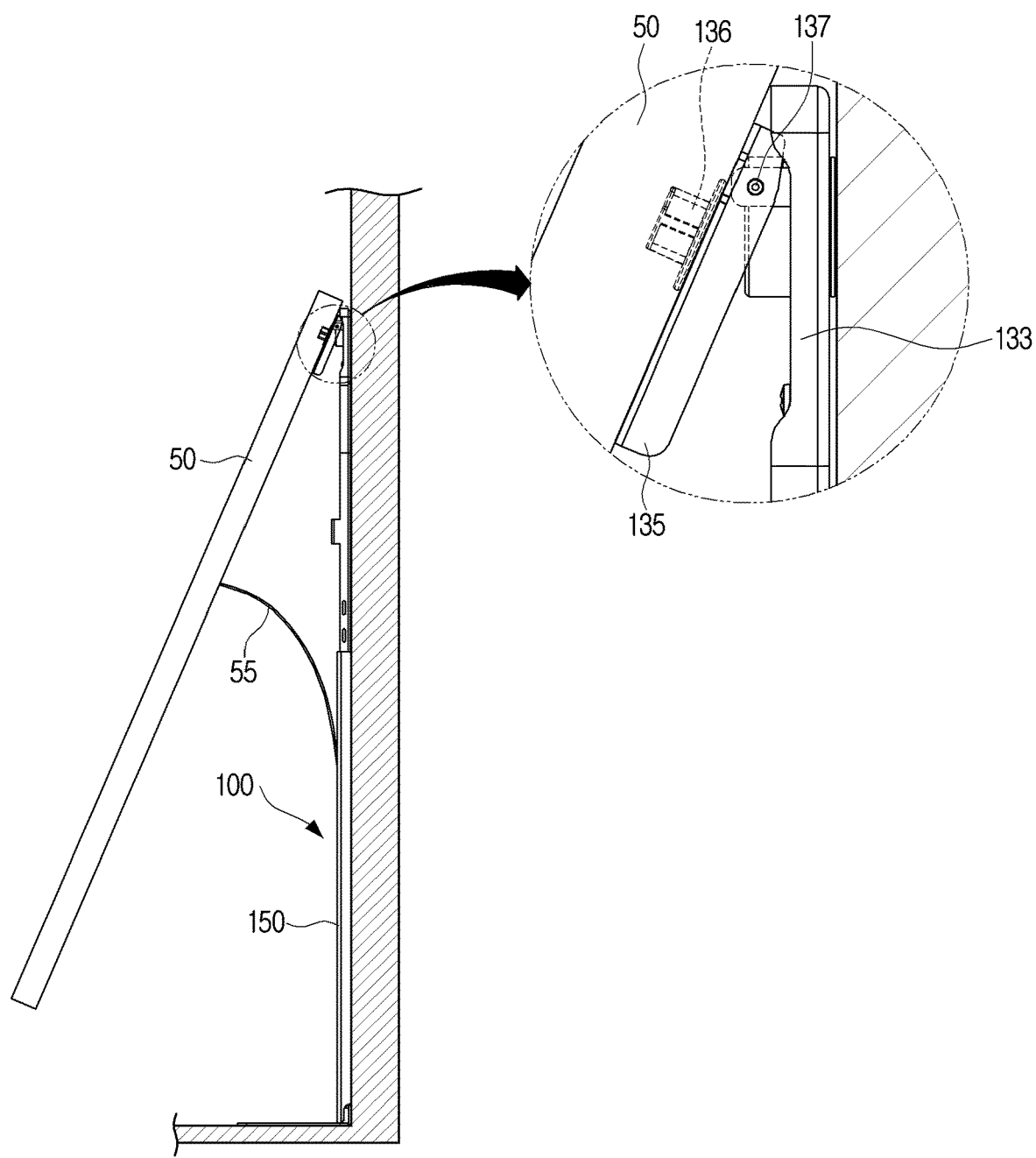
FIG. 6 is a side view illustrating a portion of a wall mount for a display apparatus according to an embodiment of the disclosure.

FIG. 6 is a side view illustrating a portion of the wall mount 100 for a display apparatus according to an embodiment of the disclosure.

Referring to FIG. 6, the coupling bracket 130 may include the bracket hinge 137.

The rotating bracket 135 may include the fastening portion 136 to be coupled in close contact with the display apparatus 50. Also, as one side of the rotating bracket 135 is coupled to the fixed bracket 133 by the bracket hinge 137, the rotating bracket 135 may be tiltable within a predetermined angle range with respect to the bracket hinge 137. In addition, the rotating bracket 135 may include the fastening portion 136 insertable into the VESA hole of the display apparatus 50 on the front surface thereof.

The display apparatus 50 may need to receive power and electrical signals from the outside. Also, in recent years, the display apparatus 50 is used as an output device by connecting an external device to the display apparatus 50 in many cases, various types of cables 55 may be connected to the display apparatus 50.

The cable 55 of the display apparatus 50 may be connected to the rear side of the display apparatus 50 to lower visibility. However, in the wall mount support method, because the display apparatus 50 is coupled to be in close contact with the wall surface 10, it may be difficult to organize the cables 55 on the rear side of the display apparatus 50.

The display apparatus 50 may be tilted based on the bracket hinge 137, and a structure and coupling method of the coupling bracket 130 in consideration of the tilting function may be varied. Referring to FIG. 2, a position at which the coupling bracket 130 is fastened to the display apparatus 50 may be a middle and lower end portion of the display as shown in FIG. 2, and in this case, a displacement of the upper end portion of the display may be greater during tilting. Alternatively, referring to FIG. 6, the bracket hinge 137 may be formed at an upper end of the coupling bracket 130, and in this case, a displacement of the lower portion of the display may be greater during tilting.

Therefore, when the display apparatus 50 is in close contact with the wall surface 10, the cables 55 connected to the rear surface of the display apparatus 50 may be easily organized. In addition, the position at which the display apparatus 50 and the coupling bracket 130 are coupled may be set to be different in consideration of the location of the cable 55 connection portion of the display apparatus 50 and the installation location of the display apparatus 50.

Figure 7A:
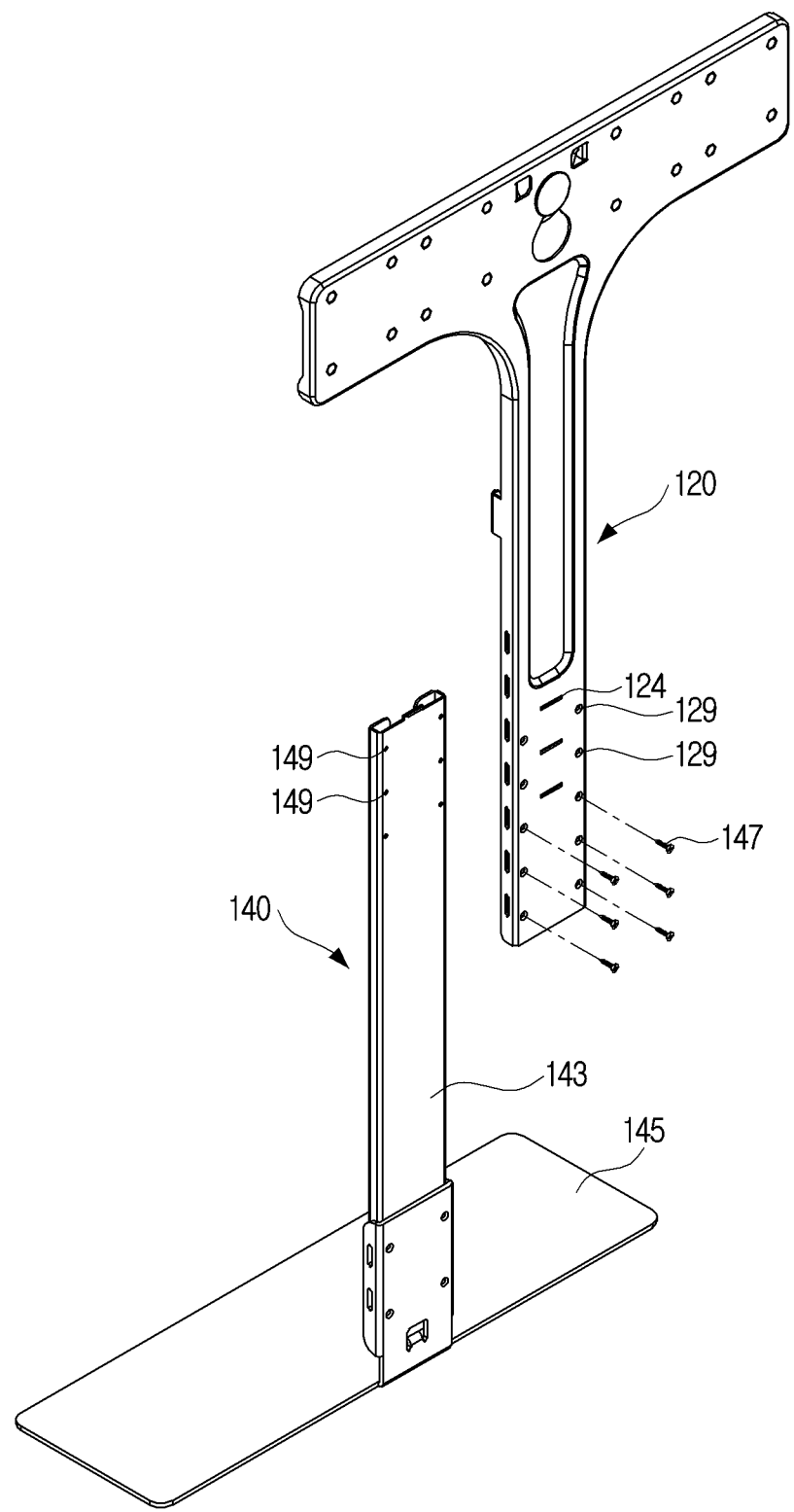
FIG. 7A is a rear perspective view illustrating a body and a stand according to an embodiment of the disclosure.

FIG. 7A is a rear perspective view illustrating the body 120 and the stand 140 according to an embodiment of the disclosure.

Referring to FIG. 7A, the body 120 may include a plurality of body holes 129, and the stand 140 may include a stand hole 149.

The plurality of body holes 129 may be vertically spaced apart from the body 120, and an even number of body holes 129 may exist symmetrically in the left and right directions. The stand hole 149 may be formed to correspond to the formation and arrangement of the plurality of body 120 holes, and may be fixed to any one of the plurality of body holes 129 by a coupling screw 147.

As the plurality of body holes 129 are vertically spaced apart from each other in a vertical direction of the body 120, the wall mount 100 for a display apparatus of the disclosure may have a height adjustment function.

When the body hole 129 and the stand hole 149 located at the upper end of the plurality of body holes 129 are fixed, a position of the body 120 may be lowered and a height of the wall mount 100 for a display apparatus may be lowered. Conversely, when the body hole 129 located at a lower end of the plurality of body holes 129 and the stand hole 149 are fixed, the position of the body 120 may be increased and the height of the wall mount 100 for a display apparatus may be increased.

The stand hole 149 may be formed on a rear surface of the body coupling portion 143 and may exist in plurality. Also, referring to FIG. 7A, the body 120 may have a structure surrounding and coupled to the rear surface and both side surfaces of the body coupling portion 143, and the body coupling portion 143 may further include a hook 144 formed on an upper surface, and the body 120 may further include a plurality of hook grooves 124, so that the hooks 144 may be fastened to the appropriate hook grooves 124 according to a height of the body 120.

Figure 7B:
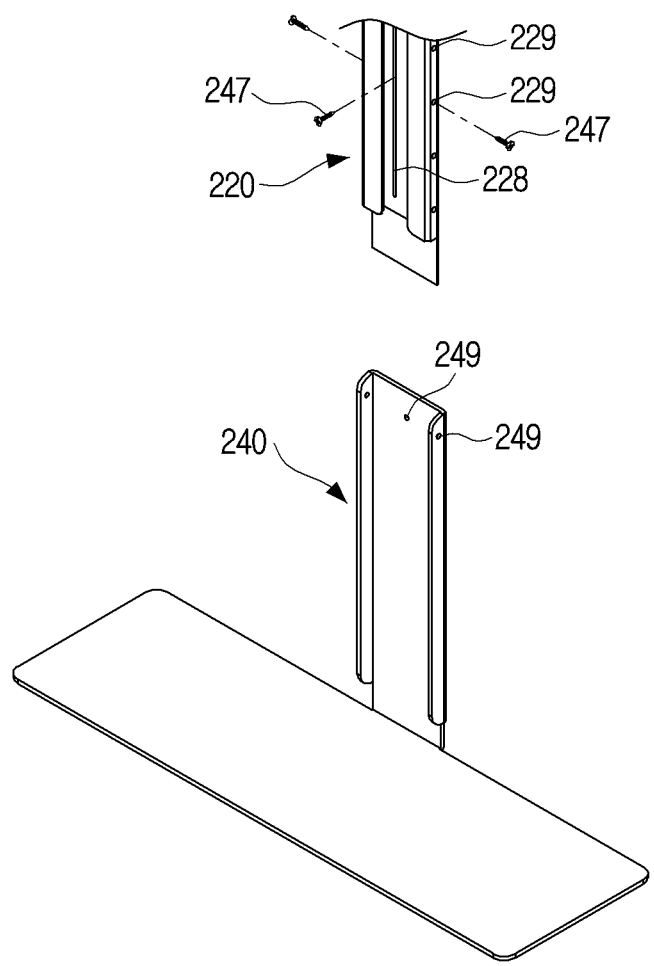
FIG. 7B is a front perspective view illustrating a body and a stand according to an embodiment of the disclosure.

FIG. 7B is a front perspective view showing the body 220 and the stand 240 according to an embodiment of the disclosure.

Referring to FIG. 7B, the wall mount 100 for a display apparatus may have different position and structure of a stand hole 249 and a body hole 229.

A portion of the stand hole 249 is formed on a side surface of the stand 240 and coupled to any one of a plurality of body holes 229 on the side surface of the body 220, and another portion of the stand hole 249 may be further formed in the center of the stand 240 and coupled to a height adjustment groove 228 having a structure extending in a vertical direction of the body 220.

In this case, because the height adjustment groove 228 is a structure that cannot fix the body in the vertical direction, only a coupling screw 247 on the side may be disassembled to be adjusted in a situation where the height adjustment of the wall mount 100 for a display apparatus is required, and because the coupling screw 247 of the height adjustment groove 228 of the center may prevent the body 220 from sliding to the front or side, it may have a function of adjusting the height more stably.

Therefore, through the structure in which the height of the body 120 may be adjusted as described above with reference to FIGS. 7A and 7B, the wall mount 100 for a display apparatus of the disclosure may be adjusted in height appropriately to fix the display apparatus 50 having panels of various sizes, and in addition, the height of the display apparatus 50 may also be adjusted according to an installation environment.

Figure 8:
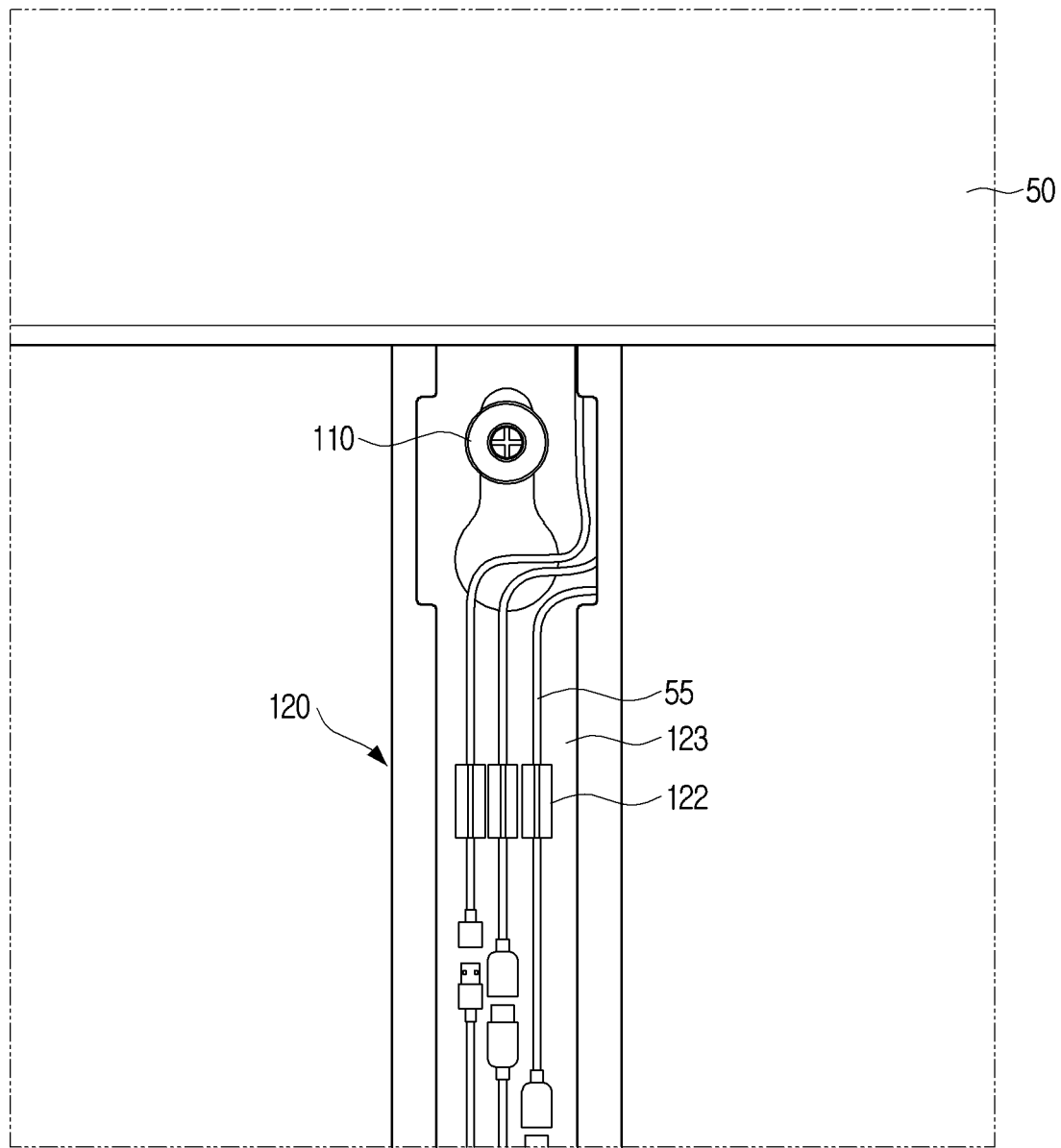
FIG. 8 is a front view illustrating a portion of a wall mount for a display apparatus according to an embodiment of the disclosure.

FIG. 8 is a front view showing a portion of the wall mount 100 for a display apparatus according to an embodiment of the disclosure.

Referring to FIG. 8, the body 120 may include a cable accommodating portion 123 and a cable holder 122.

The cable accommodating portion 123 may be a space formed inside the body 120, and may be a passage through which the cable 55 of the display apparatus 50 passes, and the cable holder 122 may be located in the cable accommodating portion 123 to support the cable 55 and organize a plurality of cables 55.

Various types of external cables 55 may be connected to the display apparatus 50. When the display apparatus 50 is fixed in close contact with the wall surface 10, it may not be easy to connect the cable 55 to the rear side of the display apparatus 50 and it may be cumbersome to disassemble the cable 55 every time it is connected.

The cable accommodating portion 123 may accommodate various types of cables 55 such as a USB cable and an HDMI cable that may be connected to the display apparatus 50 during an installation process of the wall mount 100 for a display apparatus.

The cable accommodating portion 123 may have a structure open to the front or one side, and the body cover 150 may cover the front or one side of the body 120 and prevent the cable accommodating portion 123 from being exposed to the outside to improve visibility.

Figure 9:
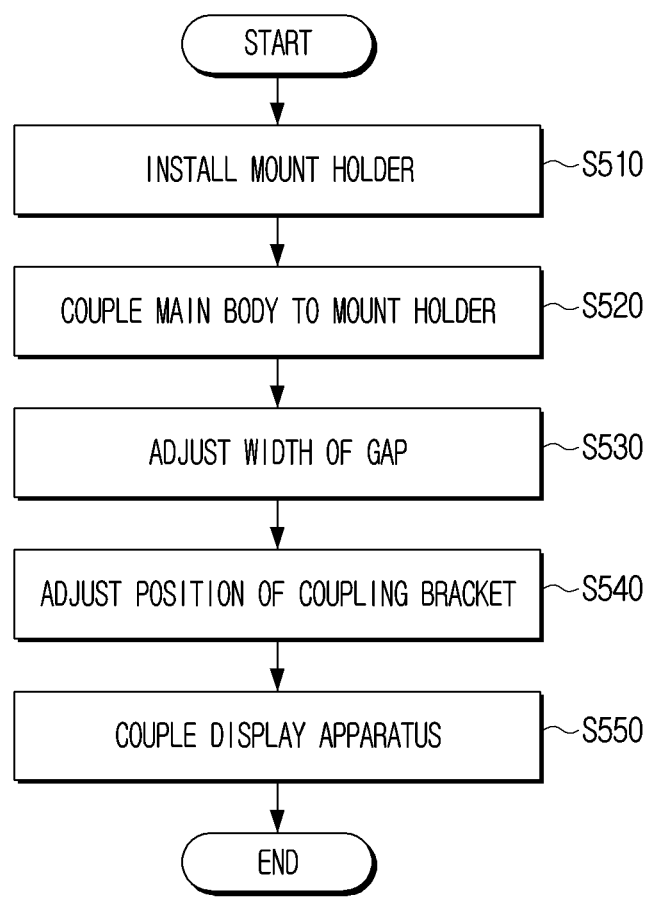
FIG. 9 is a block diagram illustrating an installation method of a wall mount for a display apparatus according to an embodiment of the disclosure.

FIG. 9 is a block diagram illustrating an installation method of the wall mount 100 for a display apparatus according to an embodiment of the disclosure Referring to FIG. 9, an installation method (S500) of the wall mount 100 for a display apparatus may be performed based on the wall mount 100 for a display apparatus described above.

In a mount holder 110 installation step (S510), the first fixing portion 115 may be fixed to the wall surface 10 with the fixing screw 113, and the second fixing portion 117 may be coupled by forming a gap to the first fixing portion 115. Alternatively, after the first fixing portion 115 is coupled, the fixing screw 113 may be coupled through both the first fixing portion 115 and the second fixing portion 117 to fix the mount holder 110. At this time, a hole into which the fixing screw 113 is inserted may be pre-constructed. Because the wall mount 100 for a display apparatus of the disclosure may support and fix the display apparatus 50 with only one screw hole, the process of constructing the hole of the fixing screw 113 may be facilitated.

In addition, in a step (S520) of coupling the body 120 and the mount holder 110, the mounting hole 125 of the body 120 may be inserted into the gap of the mount holder 110 to be coupled.

In detail, the step (S520) may include a step (S521) in which the mount holder 110 passes through a lower end portion of the mounting hole 125 having a diameter greater than an outer diameter of the mount holder 110 and a step (S523) in which the mount holder 110 is positioned at an upper end portion of the mounting hole 125 having a diameter smaller than the lower end portion by moving the body 120 in a lower end direction. Alternatively, the diameter of the mounting hole 125 may be formed to be smaller than the outer diameter of the mount holder 110, so that the first fixing portion 115 may be coupled after the second fixing portion 117 passes through the mounting hole 125.

In addition, the step (S520) may further include a step (S525) in which the clasp 121 at the upper end of the mounting hole 125 is rotated in a lower end direction to prevent separation of the mount holder 110.

In addition, the step (S520) may further include a step (S527) of adjusting a height of the body 120 and the stand 140 by fixing any one of the plurality of body holes 129 spaced apart from each other in the vertical direction of the body 120 and the stand hole 149 of the stand 140 coupled to the lower end of the body 120 to support the body 120 by the coupling screw 147.

In addition, in a step (S530) of adjusting a width of a gap, the second fixing portion 117 may be rotated in one direction and the other direction to adjust the width of the gap according to a rotation direction.

Also, in a step (S540) of adjusting a position of the coupling bracket 130, a position of the coupling bracket 130 may be adjusted by coupling the coupling bracket 130 to which the display apparatus 50 may be coupled to the bracket coupling portion 127 in a position corresponding to the structure of the display apparatus 50, among the plurality of bracket coupling portions 127 of the body 120.

In addition, in a step (S550) of coupling the display apparatus 50, the display apparatus 50 may be coupled to the coupling bracket 130.

Various exemplary embodiments of the disclosure have been individually described but the exemplary embodiments may not necessarily be implemented alone and components and operations of the respective exemplary embodiments may be combined with at least any other exemplary embodiment so as to be implemented.

Although the exemplary embodiments have been illustrated and described hereinabove, the disclosure is not limited to the above-mentioned specific exemplary embodiments, but may be variously modified by those skilled in the art without departing from the scope and spirit of the disclosure as disclosed in the accompanying claims. These modifications should also be understood to fall within the scope of the disclosure.

What is claimed is:

1. A wall mount for a display apparatus, the wall mount comprising:
    a mount holder including a first fixing portion coupleable to a wall surface by a fixing screw, and a second fixing portion coupleable to the first fixing portion; and
    a body including a coupling bracket coupleable to the display apparatus and a mounting hole insertable into a gap between the first fixing portion and the second fixing portion of the mount holder while the second fixing portion is coupled to the first fixing portion,
    wherein the second fixing portion is rotatable in a first direction and a second direction opposite to the first direction so that a width of the gap is adjusted according to the second fixing portion being rotated in the first direction and the second direction.

2. The wall mount of claim 1, wherein a lower end portion of the mounting hole has a diameter larger than an outer diameter of the mount holder and an upper end portion of the mounting hole has a diameter smaller than the diameter of the lower end portion of the mounting hole.

3. The wall mount of claim 2, wherein the body comprises a clasp formed at an upper end of the mounting hole, and
the clasp is configured to be rotatable along a vertical direction of the display apparatus so that the clasp rotates from a higher position to a lower position along the vertical direction while the mount holder is coupled to the body to prevent separation of the mount holder.

4. The wall mount of claim 1, wherein the body comprises a plurality of bracket coupling portions to which the coupling bracket is coupleable, and the coupling bracket is selectively coupleable to a bracket coupling portion among the plurality of bracket coupling portions.

5. The wall mount of claim 4, wherein the coupling bracket comprises a fixed bracket fixed to the bracket coupling portion and a rotating bracket configured to fix the display apparatus and be tiltably hinged to the fixed bracket.

6. The wall mount of claim 1, wherein
the wall mount comprises a stand coupleable to a lower end of the body to support the body,
wherein the stand comprises a body coupling portion coupleable to the body and a bottom surface configured to support the body coupling portion.

7. The wall mount of claim 6, wherein the body comprises a plurality of body holes spaced apart along a vertical direction, and the body coupling portion comprises a stand hole fixed to any hole among the plurality of body holes using a coupling screw.

8. The wall mount of claim 1, wherein the body comprises:
a cable accommodating portion including a front which is open;
a cable holder positionable in the cable accommodating portion; and
a body cover configured to cover the front of the body.

9. A wall mount for a display apparatus, the wall mount comprising:
a mount holder including a first fixing portion coupleable to a wall surface and a second fixing portion coupleable to the first fixing portion; and
a body including a coupling bracket coupleable to the display apparatus and a mounting hole insertable into a gap between the first fixing portion and the second fixing portion of the mount holder while the second fixing portion is coupled to the first fixing portion,
wherein the second fixing portion is rotatable in a first direction and a second direction opposite to the first direction so that a width of the gap is adjusted according to the second fixing portion being rotated in the first direction and the second direction,
the body comprises a plurality of bracket coupling portions to which the coupling bracket is coupleable, and the coupling bracket is selectively coupleable to a bracket coupling portion among the plurality of bracket coupling portions, and
the coupling bracket comprises a fixed bracket fixed to the bracket coupling portion and a rotating bracket configured to fix the display apparatus and be tiltably hinged to the fixed bracket.

10. A wall mount for a display apparatus, the wall mount comprising:
a mount holder including a first fixing portion coupleable to a wall surface and a second fixing portion coupleable to the first fixing portion; and
a body including:
a cable accommodating portion including a front which is open,
a cable holder positionable in the cable accommodating portion,
a body cover configured to cover the front of the body,
a coupling bracket coupleable to the display apparatus, and
a mounting hole insertable into a gap between the first fixing portion and the second fixing portion of the mount holder while the second fixing portion is coupled to the first fixing portion,
wherein the second fixing portion is rotatable in a first direction and a second direction opposite to the first direction so that a width of the gap is adjusted according to the second fixing portion being rotated in the first direction and the second direction.

* * * * *